United States Patent [19]

Zauner

[11] 4,065,605
[45] Dec. 27, 1977

[54] THERMAL CELLS

[75] Inventor: John H. Zauner, Bloomington, Ill.

[73] Assignee: National Union Electric Corporation, Stamford, Conn.

[21] Appl. No.: 406,607

[22] Filed: Jan. 27, 1954

[51] Int. Cl.² .......................................... H01M 6/36
[52] U.S. Cl. ................................................. 429/112
[58] Field of Search ................ 136/4, 5, 90, 103, 112, 136/114, 136, 137, 153, 161; 429/112

[56] References Cited
U.S. PATENT DOCUMENTS 2,666,801  1/1954  Victoreen ............................ 136/90

Primary Examiner—Leland A. Sebastian
Attorney, Agent, or Firm—Merriam, Marshall & Bicknell

EXEMPLARY CLAIM

1. Thermal cell construction comprising a stack of annular bimetal disks separated from each other by dry electrolyte, and a mass of heat source material in the cavity formed by said stack and arranged in intimate contact with said bimetal disks, said disks constituting the electrodes of said cell.

6 Claims, 2 Drawing Figures

INVENTOR.
John H. Zauner

THERMAL CELLS

This invention relates to thermal cells and has particular reference to multiple cell construction.

Thermal cells may be defined as electrochemical power supplies based upon electrolytes of various inorganic salts which remain solid and nonconducting at all storage temperatures. The electrolyte melts and becomes conducting when the cell is heated to some elevated temperature and electrical energy may then be withdrawn from the system.

A principal object of the invention is to provide a new and improved construction for multiple thermal cells.

Figure 1:
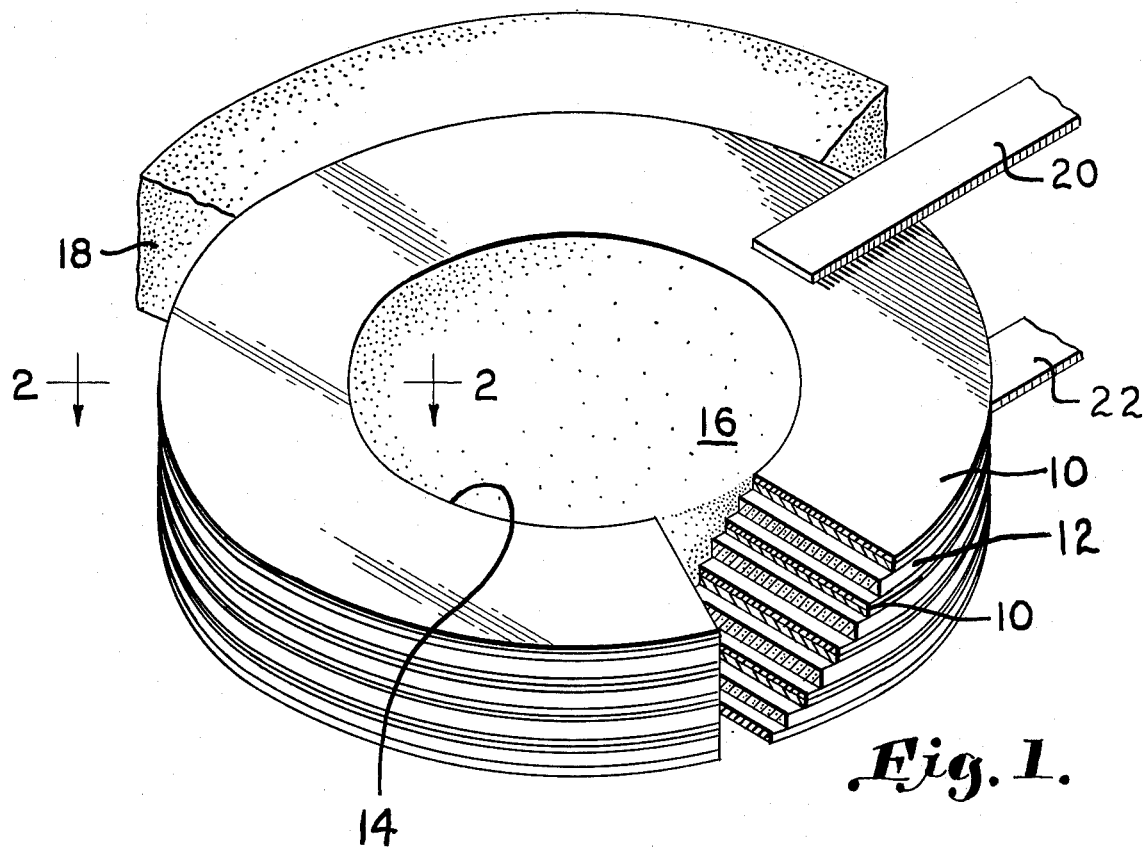
Figure 2:
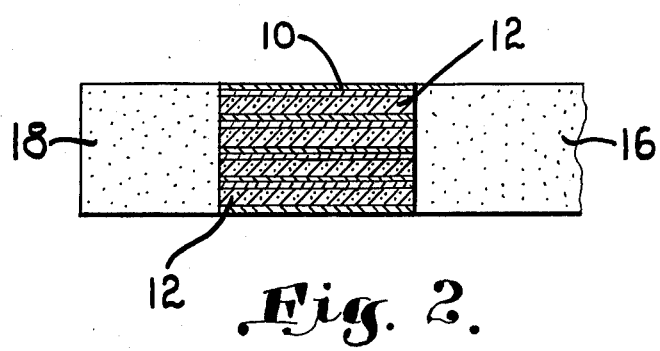

Other objects and advantages of the invention will be apparent from consideration of the following specification taken in conjunction with the accompanying drawing of which there is one sheet, and wherein:

FIG. 1 is an enlarged perspective view of a multiple cell unit embodying the invention; and FIG. 2 is a fragmentary sectional view taken along the line 2—2 of FIG. 1.

As illustrated in the embodiment of the invention selected for purposes of illustration, a multiple thermal cell unit comprises a stack of annular bimetal disks 10 separated from each other by dry electrolyte 12. The cavity 14 formed by the stack is packed with an electrical nonconducting type of heat powder 16 such for example as barium chromate and aluminum or zirconium powder. An annulus 18 of such heat powder may also, if desired, be disposed around the exterior of the stack and in intimate contact with the disks 10. The disks 10 may be nickel on one side and magnesium on the other with the electrolyte 12 separating the nickel face of one disk 10 from the magnesium face of the adjacent disk. The heat source material 16 preferably comprises any material capable of producing, when ignited, a controlled amount of heat without evolution of gaseous combustion products, although depending upon the intended use for the cell, other heat sources may be employed and any suitable means may be provided for igniting the heat source material 16.

The dry electrolyte may for example comprise equal parts by weight of potassium chloride and lithium chloride or other suitable dry electrolyte. For convenience in manufacture a glass fiber matrix may be impregnated with the electrolyte when the same is in a molten condition. The bimetal disks form the electrodes of the cell and the cathode is coated with a depolarizing agent such for example as a vanadium oxide ($V_2O_5$).

The heat liberated by the combustion of the heat source material is transferred by the metal of the disks 10 to the electrolyte 12 to activate the same. When the electrolyte is activated by heating, the electrolyte melts and electrical energy may then be withdrawn from the system, through the conductors 20 and 22 which are electrically connected to the outermost disks of the stack. The construction herein disclosed lends itself to low cost and easy manufacturing and makes it possible to obtain a capacity for unit volume which greatly exceeds other known multiple cell designs. In addition this type of construction makes it possible easily and closely to control the thermal balance of the cell.

It is possible to manufacture multiple cell units according to this design with a starting temperature range of from $-65°$ F to $165°$ F and with an operating temperature range of $400°$ C to $650°$ C. The life of the cell will vary depending upon the size thereof and the temperature and load.

While I have illustrated a preferred embodiment of the invention, it is capable of modification and, therefore, I do not wish to be limited to the precise details set forth but desire to avail myself of such changes as fall within the scope of the following claims.

I claim:

1. Thermal cell construction comprising a stack of annular bimetal disks separated from each other by dry electrolyte, and a mass of heat source material in the cavity formed by said stack and arranged in intimate contact with said bimetal disks, said disks constituting the electrodes of said cell.

2. Thermal cell construction comprising a stack of annular bimetal disks separated from each other by and in contact with dry electrolyte, said disks constituting the electrodes of said cell, the cavity formed by said stack being provided with heating means for activating said electrolyte.

3. Cell construction according to claim 2 including a heating means surrounding said stack.

4. Thermal cell construction comprising a stack of metal disks separated from each other by dry electrolyte, and a mass of heat source material arranged in intimate contact with said disks, said disks constituting the electrodes of said cell.

5. Cell construction according to claim 4 including heating means intimately associated with said disks and operable for activating said electrolyte.

6. Thermal cell construction comrising a stack of annular bimetal disks separated from each other by and in contact with dry electrolyte, a mass of heat source material in the cavity formed by said stack and arranged in intimate contact with said bimetal disks, said disks constituting the electrodes of said cell, and heat source material surrounding said stack.

* * * * *